3,333,960
ANTIHALATION AND FILTER LAYERS
Rolf-Fred Posse, Cologne-Flittard, and Franz Moll, Cologne-Stammheim, Germany, assignors to Agfa Aktiengesellschaft, Leverkusen, Germany, a corporation of Germany
No Drawing. Filed Nov. 15, 1963, Ser. No. 323,904
Claims priority, application Germany, Nov. 29, 1962,
A 41,743
1 Claim. (Cl. 96—84)

The invention concerns antihalation and filter layers with improved properties for photographic materials comprising a support and a panchromatic silver halide emulsion layer, said antihalation and filter layers containing colloidal silver as a light absorbing agent. The production of highly dispersed silver sols in aqueous solutions of organic colloids, such as gelatin, dextrin, and gum arabic, by the reduction of silver salts is already known. The known processes generally give rise to silver sols, the main absorption of which covers only a limited range of wavelengths in the visible part of the spectrum. This is a serious disadvantage when the silver sols are used as antihalation layers for panchromatic silver halide emulsion layers, or when accidental entry of light from the rear of film is to be prevented.

Both these purposes require a minimum absorption for all wavelengths of visible light. This can be achieved, for example, in the case of blue silver sols by increasing the amount of silver applied so that the required value is reached even in the regions of reduced absorption. However, this means that there will be too high an optical density in the regions of main absorption with the result that there is a wasteful use of silver.

To overcome this disadvantage, it has been proposed to add organic compounds, so-called blue-black toners, in quantities of about 1.3 grams per mol of silver nitrate that is to be reduced in the production of silver sols. However, this renders the production of silver sols much more expensive.

It has now been found that an antihalation layer or filter layer with practically uniform absorption over the whole visible spectral range can be produced by using a mixture of a blue silver sol with a yellow silver sol. The result is not only a more uniform absorption but unexpectedly also a saving in metallic silver.

The blue silver sols may be produced according to the methods disclosed in British Patent No. 843,713 or United State Patent No. 2,921,914. Yellow silver sols are disclosed in Bios Final Report 1355, page 46 and in the book of Reitstötter, "Production of Colloidal Solutions of Inorganic Substances," published by Th. Steinkopf, Leipzig, 1927, pages 17 et seq. The sols contain per liter about 10–30 grams of colloidal silver and 20 to 60 grams of protective colloid, such as gelatin. The filter and antihalation layers which are produced from these sols contain about 0.2 to 0.6 gram of silver per square meter. The two types of silver sols can be mixed in any proportion although the required absorption properties of the antihalo layer must, of course, be taken into consideration. The mixture should preferably contain about 50 to 90% by weight of blue colloidal silver and 10 to 50% by weight of yellow colloidal silver.

*Examples*

(1) A blue silver sol prepared according to the example given in United States Patent No. 2,921,914 which contains about 18 grams of silver per one kilogram of emulsion, is coated on a usual photographic film support and dried to produce an antihalation layer. The required optical minimum density for the layer is 0.9 for all wavelengths from 450 to 700 m$\mu$.

(2) The same blue silver sol is mixed with a yellow silver sol (containing about 13 grams of silver per one kilogram of emulsion) in the ratio 5:1. The mixture is coated on the same film support as used above and dried. (The yellow silver sol is produced by reduction of silver nitrate by means of dextrin, followed by dispersion in gelatin.) The color densities of, and the amount of silver present in the antihalation layers 1 and 2 are shown in the following table:

| Example | Blue Filter BG 12 | Green Filter VG 9 | Red Filter RG 2 | Silver application, g. Ag/m.$^2$ |
|---|---|---|---|---|
| 1 | 0.93 | 1.60 | 2.09 | 0.44 |
| 2 | 1.00 | 1.04 | 1.29 | 0.31 |

The blue, green and red filters used for measuring the density had a thickness of 2 mm.

We claim:
In a photographic film having a panchromatic silver halide emulsion layer and an antihalation layer containing light-absorbing material, the improvement according to which the light-absorbing material is a mixture of blue colloidal silver and yellow colloidal silver, there being of the order of 90% blue colloidal silver in the mixture.

References Cited

UNITED STATES PATENTS

| 2,462,527 | 2/1949 | McQueen | 96—84 |
| 2,688,601 | 9/1954 | Herz | 96—84 |
| 3,234,023 | 2/1966 | De Ramaix | 96—84 X |

FOREIGN PATENTS

| 421,721 | 12/1934 | Great Britain. |
| 471,520 | 9/1937 | Great Britain. |

NORMAN G. TORCHIN, *Primary Examiner.*

R. H. SMITH, *Assistant Examiner.*